United States Patent
Williams

(10) Patent No.: US 11,470,470 B2
(45) Date of Patent: Oct. 11, 2022

(54) ANONYMIZATION OF BASIC SERVICE SET IDENTIFIERS FOR WIRELESS ACCESS POINTS

(71) Applicant: Red Hat, Inc., Raleigh, NC (US)

(72) Inventor: Daniel Williams, Minneapolis, MN (US)

(73) Assignee: RED HAT, INC., Raleigh, NC (US)

( * ) Notice: Subject to any disclaimer, the term of this patent is extended or adjusted under 35 U.S.C. 154(b) by 26 days.

(21) Appl. No.: 17/112,043

(22) Filed: Dec. 4, 2020

(65) Prior Publication Data

US 2022/0182818 A1 Jun. 9, 2022

(51) Int. Cl.
| | |
|---|---|
| H04M 1/66 | (2006.01) |
| H04M 1/68 | (2006.01) |
| H04M 3/16 | (2006.01) |
| H04W 12/02 | (2009.01) |
| H04L 9/40 | (2022.01) |
| H04W 12/037 | (2021.01) |

(52) U.S. Cl.
CPC ......... H04W 12/02 (2013.01); H04L 63/0421 (2013.01); H04L 63/0428 (2013.01); H04W 12/037 (2021.01)

(58) Field of Classification Search
CPC ...... G05B 19/4155; G05B 2219/31368; H04B 3/46; H04B 17/0085; H04L 5/02; H04L 27/0002; H04L 43/045; H04L 43/18; G06F 2201/835; H04M 11/066
USPC ........................................................ 455/411
See application file for complete search history.

(56) References Cited

U.S. PATENT DOCUMENTS

| | | | |
|---|---|---|---|
| 9,294,915 B2 | 3/2016 | Fascenda | |
| 10,237,738 B2 | 3/2019 | Lee et al. | |
| 10,382,437 B2 | 8/2019 | Bauer et al. | |
| 10,462,816 B2 | 10/2019 | Patil et al. | |
| 2007/0002783 A1* | 1/2007 | Krantz | H04W 84/18 370/310 |
| 2012/0213211 A1* | 8/2012 | Remaker | H04L 61/6022 370/338 |

(Continued)

FOREIGN PATENT DOCUMENTS

| | | |
|---|---|---|
| CN | 108024309 A | 5/2018 |
| JP | 5895678 B2 | 3/2016 |

OTHER PUBLICATIONS

Author unknown; Privacy: MAC Randomization; Downloaded from: https://source.android.com/devices/tech/connect/wifi-mac-randomization on Oct. 2020; 3 pgs.

*Primary Examiner* — Tanmay K Shah
(74) *Attorney, Agent, or Firm* — K&L Gates LLP

(57) ABSTRACT

Various techniques and systems are described herein for anonymization of basic service set identifiers (BSSIDs) for wireless access points (WAPs). In various examples, a first WAP may determine a first BSSID. The first WAP may generate a first beacon packet comprising the first BSSID. A first client packet may be received, the first client packet comprising the first BSSID as a destination address of the first client packet. A determination may be made that at least a threshold amount of time has passed since the first BSSID was designated for use in beacon packets. Thereafter, the first WAP may determine a second BSSID different from the first BSSID. The first WAP may generate a second beacon packet comprising the second BSSID.

20 Claims, 5 Drawing Sheets

(56) References Cited

U.S. PATENT DOCUMENTS

| | | | |
|---|---|---|---|
| 2016/0135053 A1* | 5/2016 | Lee | H04L 63/1466 726/7 |
| 2018/0234918 A1* | 8/2018 | Asterjadhi | H04W 56/001 |

* cited by examiner

ANONYMIZATION OF BASIC SERVICE SET IDENTIFIERS FOR WIRELESS ACCESS POINTS

BACKGROUND

According to the Institute of Electrical and Electronics Engineers (IEEE) 802.11 wireless local area networking standards (including Wi-Fi), a service set is a group of wireless network devices identifiable using the same service set identifier (SSID). SSIDs are used as "network names" and are often natural language labels. A service set forms a logical network segment (e.g., Internet Protocol (IP) subnet, virtual local area network (VLAN), etc.). Basic service sets (BSS) include a subgroup of devices within a service set that are operating with the same physical layer medium access characteristics (e.g., radio frequency, modulation schema, security settings, etc.) such that the devices are configured in wireless communication with one another. Such devices within a basic service set are identified using basic service set identifiers (BSSIDs)—typically 48 bit labels that conform to media access control (MAC) address conventions.

SUMMARY

The present disclosure provides new and innovative systems and methods for anonymization of BSSIDs for wireless access points. In an example, a method includes determining, by a first wireless access point, a first basic service set identifier (BSSID). In some examples, the first wireless access point may generate a first beacon packet comprising the first BSSID. In some further examples, a first client packet may be received from a first client device. The first client packet may include the first BSSID as a destination address of the first client packet. In some examples, a determination may be made that at least a threshold amount of time has passed since the first BSSID was designated for use in beacon packets. In some further examples, the first wireless access point may determine a second BSSID different from the first BSSID. In various examples, the first wireless access point may generate a second beacon packet that includes the second BSSID.

In another example, a system includes at least one radio, at least one processor configured in communication with the at least one radio, and non-transitory computer-readable memory configured in communication with the at least one processor. In an example, the at least one processor is configured to determine a first BSSID. The at least one processor is further configured to transmit a first beacon packet that includes the first BSSID using the at least one radio. In some further examples, the at least one processor may be configured to receive, from a client device, a first client packet that includes the first BSSID as a destination address of the first client packet. In various examples, the at least one processor may determine that at least a threshold amount of time has passed since the first BSSID was designated for use in beacon packets. In other examples, the at least one processor may be configured to determine a second BSSID different from the first BSSID. In some examples, the at least one processor may be configured to transmit a second beacon packet comprising the second BSSID using the at least one radio.

In an example, a non-transitory machine readable medium stores a program, which when executed by at least one processor causes the processor to determine a first BSSID. In some examples, the program may be further effective to cause the at least one processor to generate a first beacon packet comprising the first BSSID. In some examples, the program may be further effective to cause the at least one processor to receive, from a client device, a first client packet comprising the first BSSID as a destination address of the first client packet. In some further examples, the program may be further effective to cause the at least one processor to determine that greater than a threshold amount of time has passed since the first BSSID was designated for use in beacon packets. In some examples, the program may be further effective to cause the at least one processor to determine a second BSSID that is different from the first BSSID. In some examples, the program may be further effective to cause the at least one processor to generate a second beacon packet that includes the second BSSID.

Additional features and advantages of the disclosed method and system are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
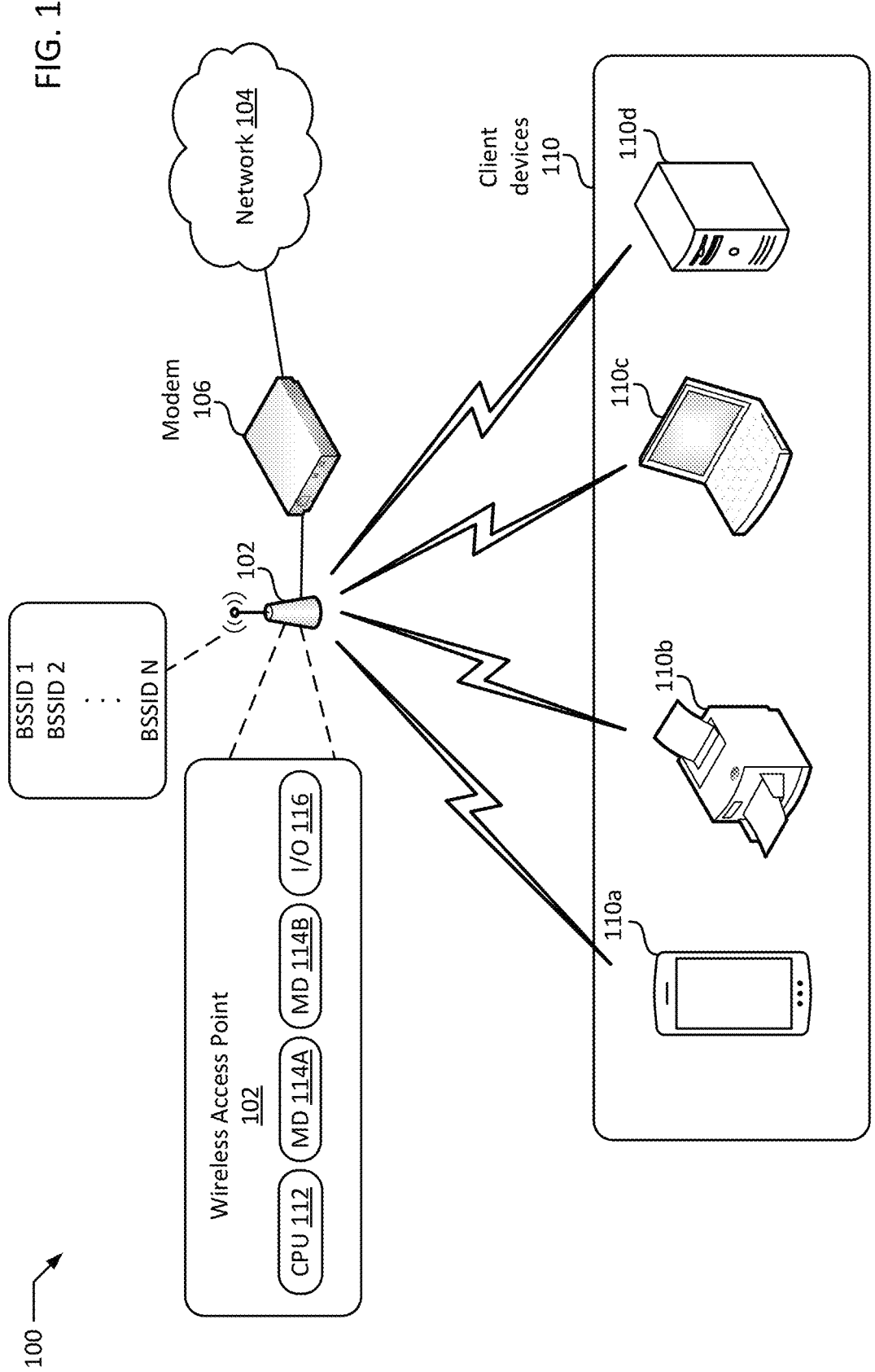
FIG. 1 illustrates a block diagram of an example computer system according to an example embodiment of the present disclosure.

Techniques are disclosed for predictable randomization of BSSIDs by wireless access points in order to anonymize the BSSIDs and reduce privacy risks associated with static BSSIDs. Wireless access points (WAP) are networking hardware devices that allow other Wi-Fi enabled devices to wirelessly connect to a wired network. The terminology "access point" (AP) is used herein to refer to WAPs, for brevity. The AP typically either connects to a router or is an integral component of a router. The AP connects to a wired local area network (LAN), such as Ethernet, and provides wireless connections using wireless LAN technology (e.g., Wi-Fi) for other devices to use the wired connection. APs support the connection of multiple wireless devices through the wired connection.

A BSSID identifies a particular radio of a particular AP. Some routers include multiple radios (e.g., operating at different frequencies) and may thus have a different BSSID for each radio, in order to distinguish between the different radios. Devices use BSSIDs to distinguish between different APs. For example, if two APs were to be within wireless communication range of a client device and the two APs were to have the same BSSID, there would be no way for the client device to distinguish between the two APs.

Vendors and/or manufacturers of APs are typically assigned a pool of MAC addresses and/or BSSIDs that are specific to that vendor/manufacturer. This pool of identifiers is referred to as an organizational unique identifier (OUI). Each AP generated by such an organization is typically assigned a single BSSID from the OUI pool. The BSSID is typically assigned to the network card of the AP during manufacture (a process typically referred to as "burning in" the BSSID). In some examples, an AP may be assigned a single BSSID per radio of the device. For example, a router may have a first radio operating at 2.4 GHz and a second radio operating at 5 GHz. In such an example, each radio may be assigned a single BSSID so that devices may distinguish between and select the appropriate radio for connection.

APs continuously transmit broadcast packets (e.g., using the IEEE 802.11 wireless communication protocol standards) that include a packet header with a source address field and a destination address field. Client devices (e.g., mobile phones, laptop computers, and/or other devices that include wireless network cards and radios) scan across Wi-Fi channels for broadcasts from APs. Broadcast packets (sometimes referred to as "beacon packets") sent by APs include the BSSID of the AP in the source address field. Client devices scan for broadcast packets and can generate a list of available APs. A client device may initiate communication with a particular AP by transmitting a packet in the relevant frequency band of the AP that includes the BSSID of the AP in the destination address field and the address of the client device in the source address field of the packet header.

There is some privacy risk associated with manufacturer-assigned BSSIDs of APs. For example, a vehicle (or other mobile system) may be equipped with a Global Positioning System (GPS) sensors and one or more Wi-Fi network cards that may scan for Wi-Fi APs as the vehicle moves from place to place. Since APs typically use a static BSSID that is burned-in during manufacture of the device, the BSSID of the AP may be used to associate the AP with a particular geographic location of the AP. Databases may be generated that associate BSSIDs with the respective geographic location of the APs. Further, since users typically change APs every few years, and since APs typically use a single, static BSSID, the link between a geographic location and the BSSID may remain valid for years.

Client device manufacturers have been randomizing MAC addresses for client devices for a number of years in order to anonymize client devices and prevent harvesting of personally identifiable information (PII) from the client devices. However, APs typically continue to use static BSSIDs. One issue with randomizing BSSIDs is that client devices (e.g., phones, computers, Internet-of-Things (IoT) devices) use the BSSID to store network settings for the AP, auto-connect to known networks, and provide hints that the Wi-Fi network is permitted for connection, etc. Randomization of BSSIDs breaks these assumptions and forces the client device to connect to the AP as though it is an initial connection to a newly-discovered AP.

Accordingly, described herein are various techniques for providing a predictable pattern of BSSID changes to APs and client devices. The BSSID changes may appear random to devices that are not privy to the predictable pattern of changes. Using such techniques, the linkage between the AP and the geographic location of the AP may be severed to preserve privacy.

For example, during an initial communication session between a client device and an AP, various data may be exchanged (e.g., timestamped messages, authentication credentials, SSID data, etc.). Such data may be used as seed data for a cryptographic function that may output a list of different BSSIDs for use by the AP. Since the seed data is exchanged between the AP and the client device (e.g., during a handshake operation), both the AP and the client device are able to generate the same list of BSSIDs. Over time, the AP may change BSSIDs (e.g., periodically, semi-periodically, or randomly). However, since the client device is privy to the same list of BSSIDs, the client device can verify that the changed BSSID pertains to the same AP and may use stored settings and credentials for auto-connection to the AP. However, to other devices (e.g., potentially malicious actors attempting to correlate an AP to a particular geographic location) that are not privy to the list of BSSIDs, the changed BSSID may seem as though it has been transmitted by a new, different AP. Accordingly, Wi-Fi devices that are unknown to the AP may be unable to discover longstanding correlations between the AP and a particular geographic location.

FIG. 1 illustrates a block diagram of an example computer system 100 according to an example embodiment of the present disclosure. The computer system 100 may comprise a WAP 102 configured in communication (e.g., wired communication) with a modem 106. The modem 106 may, in turn, be configured in communication with a network 104 (e.g., a wide area network (WAN) such as the Internet).

WAP 102 may comprise one or more central processing units (CPU) 112 communicatively coupled to memory devices (e.g., MD 114A-B) and input/output devices (e.g., I/O 116). In various further examples, the WAP 102 may comprise a radio and at least one antenna (and associated circuitry) effective to transmit and receive wireless signals.

Client devices 110 may be computing devices comprising wireless network functionality that may be effective to communicate with one another and/or with network 104 through WAP 102. In the example depicted in FIG. 1, client devices 110 comprise a smart phone 110a, a printer 110b, a laptop 110c, and a desktop computing device 110d. It should be appreciated that other wireless devices, apart from those specifically shown in FIG. 1, may communicate with WAP 102.

WAP 102 may transmit beacon packets periodically (or semi-periodically). The beacon packets may broadcast the availability of the WAP 102 for connection to the network 104. Beacon packets broadcast by WAP 102 may comprise a packet header including a BSSID associated with the WAP 102 in a source address field of the packet header. Since the beacon packets are transmitted to any Wi-Fi enabled devices within range of the WAP 102, the destination address field of the beacon packet header may be "blank" (e.g., all 0 values or all 1 values).

The WAP 102 may be effective to change the BSSID transmitted as the source address in the beacon packet headers over time in order to mitigate the privacy risks associated with a static BSSID described herein. However, as described in further detail below, the BSSID value may be changed in a way that is predictable to the client devices 110 that have previously connected to the WAP 102. Accordingly, the client devices 110 that were previously connected to the WAP 102 may store network settings for the WAP 102 and may recognize the WAP 102's BSSIDs for auto-connection. Otherwise, if the BSSID of the WAP 102 were simply changed in a random (or unpredictable) way, the client device 110 may not recognize the WAP 102 (even though the WAP 102 uses the same SSID as in a previous connection) since the BSSID has changed to a different value. In response to such an unrecognized BSSID, the client device may not allow automatic connection and may require manual connection by the user. This can lead to frustrating and/or time consuming user experiences.

In some examples, the WAP 102 may use a cryptographic technique to generate a list of BSSIDs (e.g., BSSID 1, BSSID 2, . . . , BSSID N) for the WAP 102. After an initial connection between the WAP 102 and a client device 110, the WAP 102 may send a list of future BSSID changes to the client device 110. Accordingly, the client device 110 may recognize the WAP 102 for future connections using the previously-received list of BSSIDs. The list of BSSIDs generated using the cryptographic function may be deterministic for the particular seed values, but may be pseudo-random in terms of the actual values with respect to one another.

In some other examples, the seed values for the cryptographic function used to generate the list of BSSIDs for the WAP 102 may be shared with the client device 110 during an initial connection between the WAP 102 and the client device 110. Accordingly, the client device 110 and the WAP 102 may independently generate the same list of BSSIDs. However, other clients that are not privy to the seed values established during the initial connection with the BSSID may be unable to ascertain that the changing BSSIDs of the WAP 102 pertain to the same access point.

Figure 2:
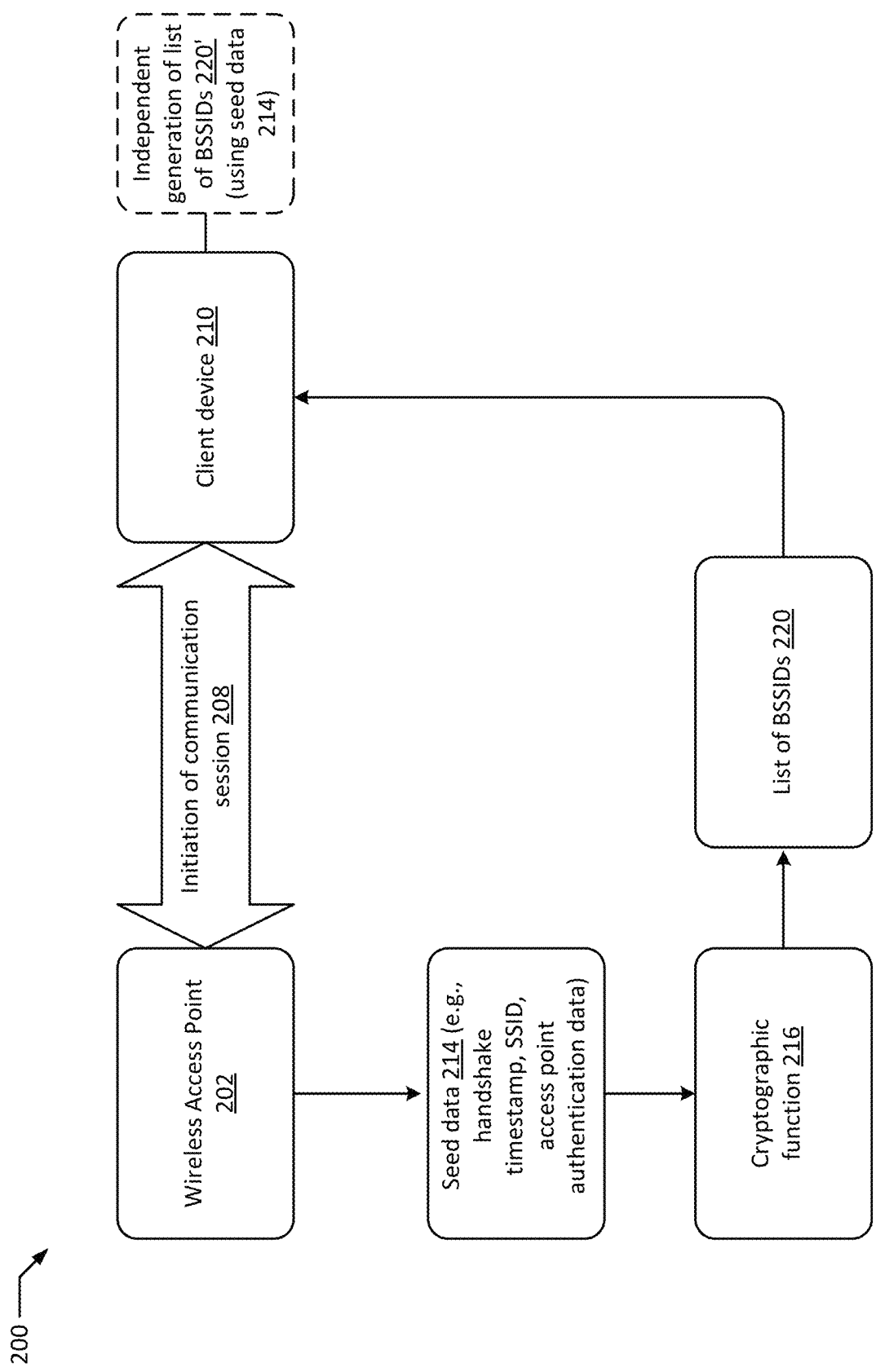
FIG. 2 illustrates an example block diagram illustrating generation of a list of BSSIDs for a wireless access point, according to various aspects of the present disclosure.

FIG. 2 illustrates an example block diagram 200 illustrating generation of a list of BSSIDs for a wireless access point, according to various aspects of the present disclosure. WAP 202 may initiate a communication session 208 with a client device 210. In various examples, the initiation of the communication session 208 may be an initial connection between the WAP 202 and the client device 210.

In various examples, the client device 210 and the WAP 202 may perform a handshake procedure. The handshake is used to authenticate the client device 210 to the WAP 202 and to encrypt communications with the WAP 202. The handshake is performed by the WAP 202 and client device 210 independently proving that both devices are in possession of a pre-shared key (PSK), without disclosing the PSK to one another. Typically, during a handshake, the client device 210 and the WAP 202 send encrypted messages to each other that are decrypted using the PSK. The decrypted message is sent back to the other device and checked against the original message. If the decrypted message matches the original message, the handshake is successful.

The WAP 202 may determine seed data 214. Depending on the particular implementation, the seed data 214 may comprise various different values. For example, seed data 214 may include a timestamp of a handshake performed between the WAP 202 and the client device 210 (e.g., a timestamp associated with initiation of communication session 208). In some examples, the seed data 214 may comprise the SSID of the WAP 202. In some other examples, the seed data 214 may comprise a passcode and/or other authentication data used to authenticate a client device to the WAP 202. In general, the seed data 214 may be any data that may be passed to a cryptographic function 216 to generate a list of different BSSIDs for the WAP 202.

The cryptographic function 216 may be an algorithm effective to receive the seed data and generate a one-time pad list of BSSIDs 220 for the WAP 202. In one embodiment, the list of BSSIDs 220 may be sent to the client device 210 during or after the initiation of communication session 208. Accordingly, when the WAP 202 changes BSSIDs, the client device 210 may determine that the new BSSID pertains to the same WAP 202 and may use the previously-stored configuration settings and may auto-connect to the WAP 202. In some other examples, the seed data 214 may be shared with the client device 210. Accordingly, the client device 210 may use the seed data 214 and the cryptographic function 216 independently of the WAP 202 to generate the same list of BSSIDs 220'.

Accordingly, since client device 210 shares the list of BSSIDs 220 with the WAP 202, the client device 210 is able to verify that any BSSID of the list of BSSIDs 220 pertains to the same access point (e.g., WAP 202). Conversely, any client device that is not privy to the list of BSSIDs 220 (or the seed data 214), may be unable to determine that different BSSIDs from WAP 202 pertain to the same access point.

One-time pad refers to a list of codes (e.g., BSSIDs) that are used for a period of time and then which are no longer valid. Accordingly, a one-time pad list of BSSIDs for WAP 202 allows the WAP 202 to use a first BSSID for some amount of time and then to switch to some other BSSID from the list of BSSIDs 220, at which time the first BSSID becomes invalid (as it has been previously used). The WAP 202 may change BSSIDs to new values of the list of BSSIDs 220 according to any desired time period. For example, the WAP 202 may change BSSIDs weekly, daily, monthly, bi-monthly, hourly, semi-annually, etc.

Figure 3:
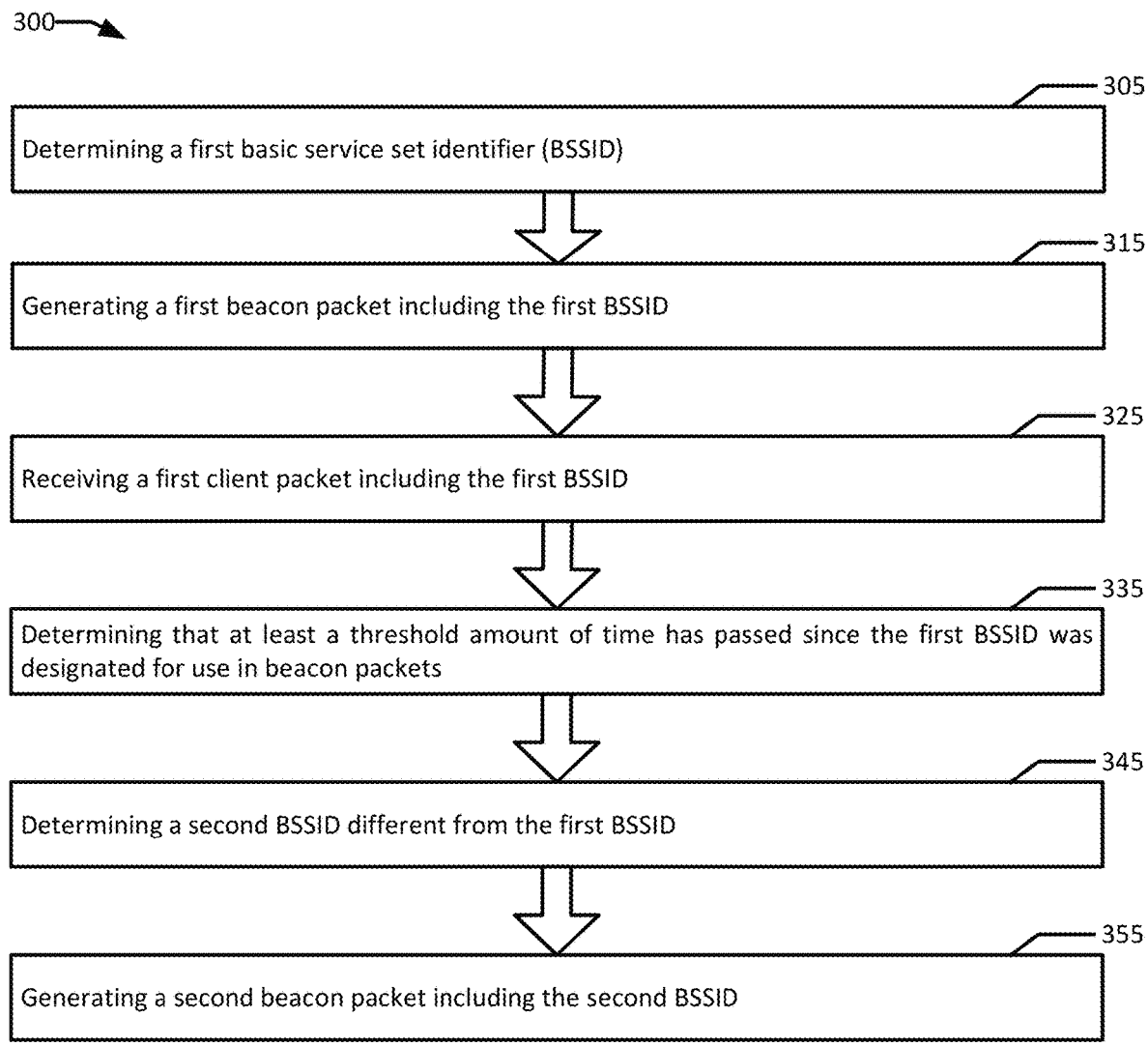
FIG. 3 illustrates a flowchart of an example process for anonymization of BSSIDs for a wireless access point, according to an example embodiment of the present disclosure.

FIG. 3 illustrates a flowchart of an example process 300 for anonymization of BSSIDs for a wireless access point, according to an example embodiment of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 300 may begin with determining a first BSSID (block 305). For example, a wireless access point may initially use a first BSSID (e.g., BSSID of list of BSSIDs 220). In some examples, the first BSSID may be generated according to a cryptographic function as part of a one-time pad codebook of BSSIDs.

The example process 300 may continue with generating a first beacon packet including the first BSSID (block 315). The first beacon packet may be transmitted by the wireless access point (e.g., by WAP 102) with the first BSSID in a source address field of the first beacon packet. The first beacon packet may be repeatedly transmitted in order to advertise the availability of the wireless access point to client devices (e.g., to client devices 110).

The example process 300 may continue with receiving a first client packet including the first BSSID (block 325). For example, the client packet may include the first BSSID in a destination address field of the first client packet. In various examples, the first client packet may be received from a client device (e.g., from smart phone 110a) that has previously authenticated itself to the wireless access point and which includes a list of current and future BSSIDs (e.g., list of BSSIDs 220) to be used by the wireless access point.

Processing may continue with determination may be made that greater than a threshold amount of time has passed since the first BSSID was designated for use in beacon packets (block 335). For example, the wireless access point (e.g., WAP 102) may determine that the BSSID is to be changed every 2 weeks. If the first BSSID (e.g., a BSSID from the list of BSSIDs 220) has been used in beacon packets for more than 2 weeks (e.g., greater than the threshold amount of time), the wireless access point may designate the first BSSID as invalid and may proceed to select a new BSSID (e.g., from a one-time pad list of BSSIDs) for use.

Processing may continue with determining a second BSSID that is different from the first BSSID (e.g., a different BSSID from list of BSSIDs 220) (block 345). As previously described, the second BSSID may be generated as part of a list of BSSIDs generated using a cryptographic function (e.g., cryptographic function 216). The list of BSSIDs and/or the seed values of the cryptographic function used to generate the list of BSSIDs may be shared with client devices that have previously connected to the wireless access point, so that these client devices are able to automatically connect and load network settings for the wireless access point without requiring a manual connection procedure.

Processing may continue with generating a second beacon packet including the second BSSID (block 355). In various examples, beacon packets including the second BSSID (e.g., the second BSSID determined at block 345) may be periodically transmitted (e.g., every 10 mS or at some other cadence) until the threshold amount of time for using the second BSSID in beacon packets has been surpassed.

Figure 4:
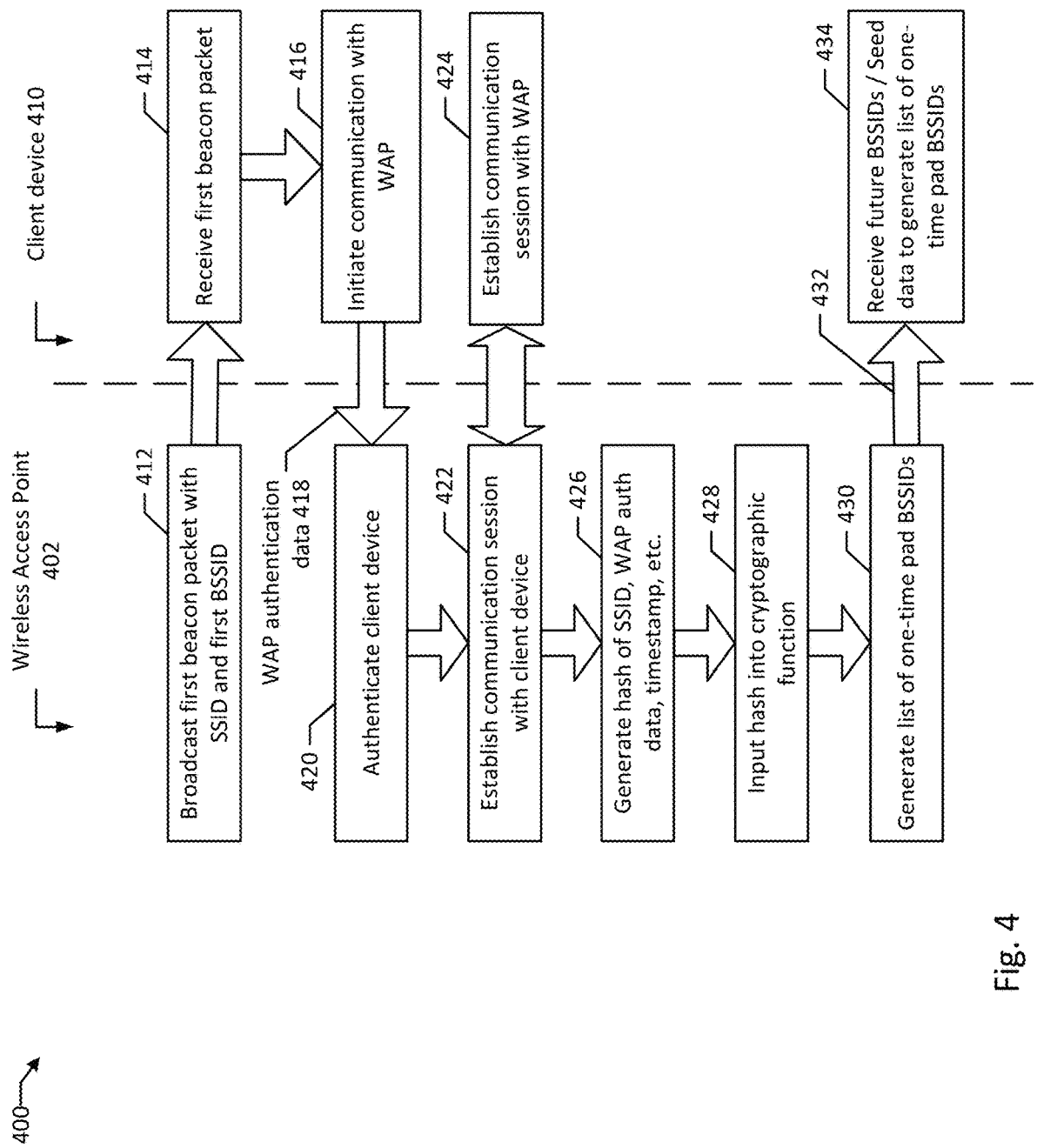
FIG. 4 illustrates a flow diagram of an example process for anonymization of BSSIDs for a wireless access point, according to an example embodiment of the present disclosure.

FIG. 4 illustrates a flow diagram of an example process for anonymization of BSSIDs for a wireless access point, according to an example embodiment of the present disclosure. Although the example process 400 is described with reference to the flow diagram illustrated in FIG. 4, it will be appreciated that many other methods of performing the acts associated with the process 400 may be used. For example, the order of some of the blocks may be changed, certain blocks may be combined with other blocks, blocks may be repeated, and some of the blocks described are optional. The process 400 may be performed by processing logic that may comprise hardware (circuitry, dedicated logic, etc.), software, or a combination of both. In some examples, a combination of computing devices may execute the various actions described in reference to FIG. 4. For example, a WAP 402 and a client device 410 may initiate a communication session and may generate the seed data that may be input into a cryptographic function to determine a set of BSSIDs for the WAP 402. In some examples, the actions described in the blocks of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

In the illustrated example, a WAP 402 may broadcast a first beacon packet that comprises an SSID and a first BSSID (block 412). The SSID may identify the network name associated with the WAP 402. The first BSSID may be the source address of the particular radio of the WAP 402 that is sending the first beacon packet.

Client device 410 (e.g., a device with a network card configured to use Wi-Fi communication) may scan for and receive the first beacon packet (block 414). The client device 410 may determine the SSID, timestamp of the first beacon frame, capability information of the access point (e.g., encryption details, support for polling, frequency-hopping (FH) parameter set, direct-sequence (DS) parameter set), etc.

The client device 410 may initiate communication with the WAP 402 (block 416) by sending a packet requesting authentication and association with the WAP 402. The client device 410 may send WAP authentication data 418 (e.g., a network passcode and/or data encrypted using a PSK). The WAP 402 may receive the WAP authentication data 418 and may authenticate the client device 410 (block 420). For example, the WAP 402 may determine if the passcode matches a passcode stored locally by the WAP 402 or by a remote secure authentication server.

The WAP 402 and the client device 410 may establish a communication with one another (blocks 422 and 424). Establishing communication between WAP 402 and client device 410 may involve a handshake operation during which messages are exchanged between the WAP 402 and the client device 410 to generate encryption keys that are used to encrypt and decrypt subsequent data sent during wireless communication between the client device 410 and the WAP 402.

In the example depicted in FIG. 4, the WAP 402 may generate a hash of the SSID, the WAP authentication data (e.g., the passcode), the timestamp, and/or other data exchanged during the handshake and/or client device authentication (block 426). Any hash function may be used to generate the hash. The hash function may be used to transform the input data (which may be of variable size) to a fixed-size value. The hash may be input as seed data into a cryptographic function (block 428). The cryptographic function may be configured to generate a list of one-time pad BSSIDs from the input hash (block 430). The BSSIDs in the list may each be valid for use in beacon packets broadcast by the WAP 402 for a pre-defined period of time, after expiration of which time the BSSID may no longer be valid.

Data 432 may comprise either a list of future BSSIDs to be used by the WAP 402 or may include the seed data (and/or the hash of the seed data) used by the cryptographic function to generate the list of one-time pad BSSIDs. In the former case, the client device 410 may receive the list of future BSSIDs (block 434). Thereafter, the client device 410 may autoconnect to the WAP 402 since the client device 410 is able to verify that the BSSIDs included in beacon packets broadcast by the WAP 402 are among the BSSIDs in the list of future BSSIDs. In the latter case, the client device may use the seed data (or the hash thereof) received at block 434 to independently generate the one-time pad of BSSIDs to be used by the WAP 402. The client device 410 may verify that BSSIDs included in beacon packets broadcast by the WAP 402 are on the client-generated list of BSSIDs and may thereby verify that the access point is recognized to enable autoconnection.

In some examples, it may be advantageous to generate the list of BSSIDs by the WAP 402 and send the list of future BSSIDs to the client device 410. This is because independent generation of the one-time pad BSSIDs by the client device 410 may consume battery power of a mobile device.

Generating a list of BSSIDs that the access point may change over time may enhance privacy for wireless access points since it is no longer possible to establish an association between a static BSSID and a particular geographic location. There is no way for a scanning device that does not have access to either the list of future BSSIDs or the seed data used to independently generate the list of BSSIDs to determine that a changed BSSID is, in fact, related to the same access point. Accordingly, the access point is effectively anonymized using the variable BSSIDs without loss of convenience or security for authenticated and associated client devices.

Figure 5:
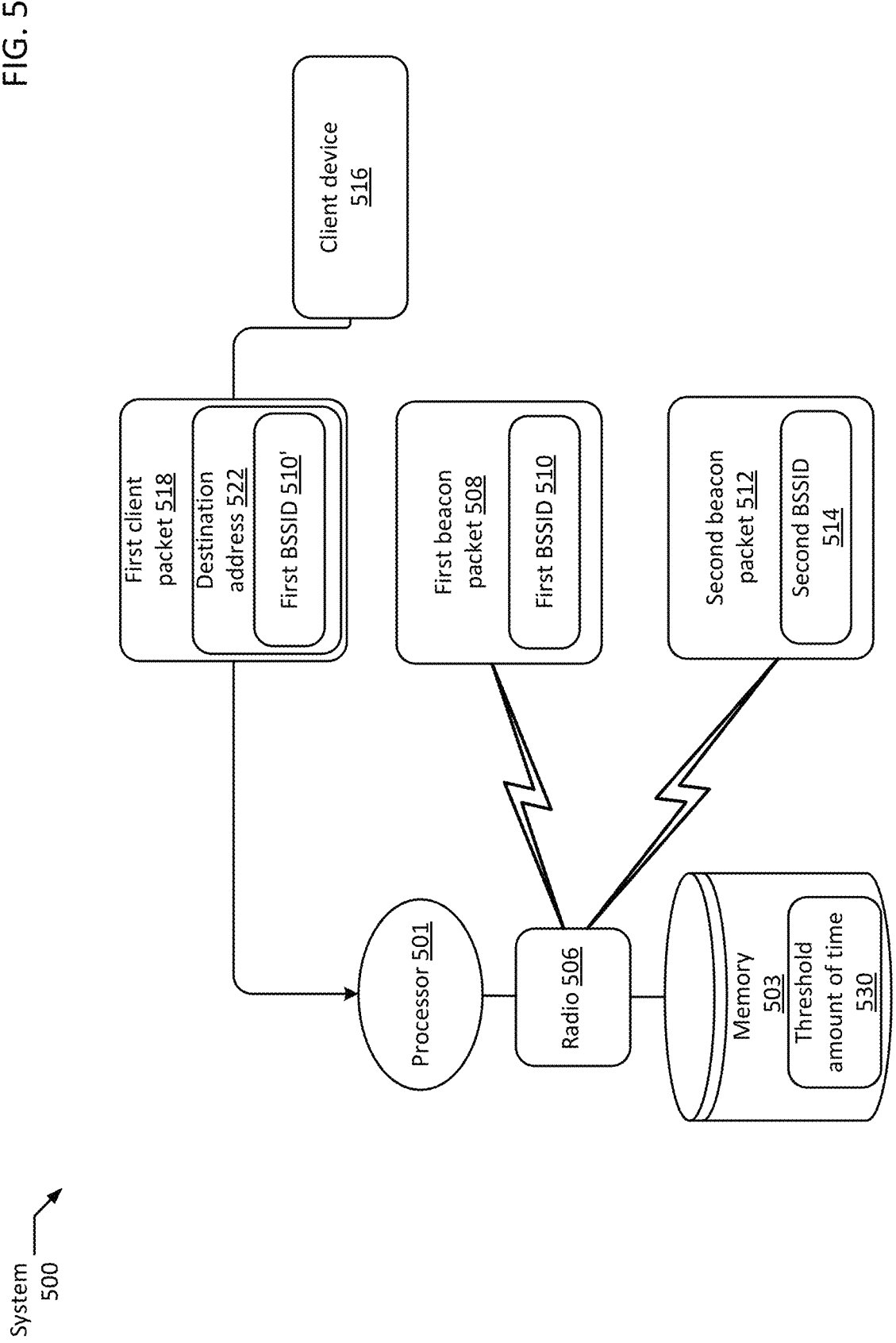
FIG. 5 illustrates a block diagram of an example system for anonymization of BSSIDs, according to an example embodiment of the present disclosure.

FIG. 5 is a block diagram of an example system 500 for anonymization of BSSIDs according to an example embodiment of the present disclosure. The system 500 includes a memory 503, a processor 501 in communication with the memory 503, and a radio 506 in communication with the processor 501 and the memory 503.

The processor 501 may control the radio 506 to generate a first beacon packet 508. The first beacon packet 508 may include a first BSSID 510 in a source address field of the packet header. Client device 516 (e.g., a Wi-Fi enabled device such as a smart phone, a wireless printer, a laptop, etc.) may scan for and detect the first beacon packet 508 and may transmit a first client packet 518 (e.g., using a radio of the client device 516). The first client packet 518 may comprise the first BSSID 510' in the destination address 522 field of the first client packet 518. The first BSSID 510' may be the same value as the first BSSID 510 included in the first beacon packet 508.

The processor 501 may be included in a wireless access point. The processor 501 may authenticate and/or perform a handshake with the client device 516 in response to receipt of the first client packet 518.

The processor 501 may determine a threshold amount of time 530 stored in memory 503. The threshold amount of time may be, for example, an amount of time that a BSSID is to be used in broadcast beacon packets before changing to a different BSSID. Accordingly, the processor 501 may determine that greater than the threshold amount of time 530 has elapsed since the processor 501 began including the first BSSID 510 in beacon packets (including first beacon packet 508) broadcast using radio 506. Upon determining that greater than the threshold amount of time 530 has elapsed since the processor 501 began including the first BSSID 510 in beacon packets, the processor 501 may change the BSSID that is included in broadcast beacon packets to a different BSSID. For example, the processor 501 may determine a BSSID from a list of one-time pad BSSIDs. As previously described, in some examples, the list of one-time pad BSSIDs may be generated using a cryptographic function. The seed data input into the cryptographic function to generate the list of one-time pad BSSIDs may be generated during a handshake and/or authentication of the client device 516.

Processor 501 may control radio 506 to transmit the second beacon packet 512. The second beacon packet 512 may include second BSSID 514 in the source address filed of the packet header. As previously described, the second BSSID 514 may be from the list of BSSIDs generated by processor 501 using the cryptographic function. Accordingly, the second BSSID 514 may be recognizable by the client device 516—either because the client device 516 has received a list of future BSSIDs to be used by the access point, or because the client device 516 has received the seed data and data identifying the cryptographic function such that the client device 516 is able to independently generate the list of BSSIDs to be used by the access point.

Among other potential benefits, the various systems and techniques described herein allow an access point to change its BSSID over time in a predictable way that maintains client device auto-connection capability while enhancing privacy. Clients that are not privy to the seed data used to generate the different BSSIDs and/or the list of future BSSIDs are unable to verify that the different BSSIDs relate to the same access point. Accordingly, the linkage between the geographic location of the access point and the BSSID is severed, enhancing privacy.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as application specific integrated circuits (ASICs), field programmable gate arrays (FPGAs), digital signal processors (DSPs) or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method, comprising:
determining, by a first wireless access point, a first basic service set identifier (BSSID) among a list of BSSIDs generated by the first wireless access point;
generating, by the first wireless access point, a first beacon packet comprising the first BSSID;
receiving, from the client device, a first client packet comprising the first BSSID as a destination address of the first client packet;
determining that at least a threshold amount of time has passed since the first BSSID was designated for use in beacon packets;
determining, by the first wireless access point, a second BSSID different from the first BSSID; and
generating, by the first wireless access point, a second beacon packet comprising the second BSSID, wherein the client device auto-connects with the first wireless access point based at least in part on the second BSSID being included in the list of BSSIDs.

2. The method of claim 1, further comprising:
initiating a communication session with the client device; and
generating, by the first wireless access point, the list of BSSIDs by inputting at least a service set identifier (SSID) associated with the first wireless access point and authentication data for the first wireless access point into a cryptographic function, wherein the list of BSSIDs comprises the first BSSID and the second BSSID.

3. The method of claim 1, wherein the first BSSID and the second BSSID are pseudo-randomly generated using a cryptographic function.

4. The method of claim 1, further comprising:
determining a timestamp associated with initiation of a communication session with the client device;
receiving authentication data for the first wireless access point from the client device; and
generating the first BSSID and the second BSSID based at least in part on the timestamp and the authentication data.

5. The method of claim 1, wherein the client device is configured to determine a service set identifier (SSID) associated with the first wireless access point, and determine that the second BSSID is stored in a memory in association with the SSID.

6. The method of claim 1, further comprising:
generating, by the first wireless access point, the list of BSSIDs, wherein the list of BSSIDs comprises the first BSSID and the second BSSID; and
sending the list of BSSIDs to the client device.

7. The method of claim 1, further comprising:
determining first seed data during a communication session between the first wireless access point and the client device; and
generating the first BSSID and the second BSSID by inputting the first seed data into a cryptographic function.

8. The method of claim 7, wherein both the first wireless access point and the client device generate the first BSSID and the second BSSID.

9. The method of claim 1, further comprising prior to generating the second beacon packet, designating the first BSSID as previously-used.

10. A system, comprising:
at least one radio;
at least one processor; and
non-transitory computer-readable memory configured in communication with the at least one processor, wherein the at least one processor is configured to:
determine a first basic service set identifier (BSSID) among a list of BSSIDs generated by a first wireless access point;
transmit a first beacon packet comprising the first BSSID using the at least one radio;
receive, from a client device, a first client packet comprising the first BSSID as a destination address of the first client packet;
determine that at least a threshold amount of time has passed since the first BSSID was designated for use in beacon packets;
determine a second BSSID different from the first BSSID; and
transmit a second beacon packet comprising the second BSSID using the at least one radio, wherein the client device auto-connects with the first wireless access point based at least in part on the second BSSID being included in the list of BSSIDs.

11. The system of claim 10, the non-transitory computer-readable memory storing further instructions that, when executed by the at least one processor, are further effective to cause the at least one processor to:
initiate a communication session with the client device; and
generate the list of BSSIDs by inputting at least a service set identifier (SSID) associated with a first wireless access point and authentication data for the first wireless access point into a cryptographic function, wherein the list of BSSIDs comprises the first BSSID and the second BSSID.

12. The system of claim 10, wherein the first BSSID and the second BSSID are pseudo-randomly generated using a cryptographic function.

13. The system of claim 10, the non-transitory computer-readable memory storing further instructions that, when executed by the at least one processor, are further effective to cause the at least one processor to:
determine a timestamp associated with initiation of a communication session with the client device;
receive authentication data for a first wireless access point from the client device; and
generate the first BSSID and the second BSSID based at least in part on the timestamp and the authentication data.

14. The system of claim 10, wherein the client device is configured to determine a service set identifier (SSID) associated with a first wireless access point, and determine that the second BSSID is stored in a memory in association with the SSID.

15. The system of claim 10, the non-transitory computer-readable memory storing further instructions that, when executed by the at least one processor, are further effective to cause the at least one processor to:
generate, by a first wireless access point, the list of BSSIDs, wherein the list of BSSIDs comprises the first BSSID and the second BSSID; and
send the list of BSSIDs to the client device.

16. The system of claim 10, the non-transitory computer-readable memory storing further instructions that, when executed by the at least one processor, are further effective to cause the at least one processor to:
determine first seed data during a communication session between a first wireless access point and the client device; and
generate the first BSSID and the second BSSID by inputting the first seed data into a cryptographic function.

17. The system of claim 10, wherein both the at least one processor and the client device generate the first BSSID and the second BSSID.

18. A non-transitory machine readable medium storing a program, which when executed by at least one processor causes the at least one processor to:
determine a first basic service set identifier (BSSID) among a list of BSSIDs generated by a first wireless access point;
generating a first beacon packet comprising the first BSSID;
receive, from a client device, a first client packet comprising the first BSSID as a destination address of the first client packet;
determine that greater than a threshold amount of time has passed since the first BSSID was designated for use in beacon packets;
determine a second BSSID different from the first BSSID; and
generating a second beacon packet comprising the second BSSID, wherein the client device auto-connects with the first wireless access point based at least in part on the second BSSID being included in the list of BSSIDs.

19. The non-transitory machine readable medium of claim 18, storing the program, which, when executed by the at least one processor, further causes the at least one processor to:

initiate the communication session with the client device; and generate a list of BSSIDs by inputting at least a service set identifier (SSID) associated with a first wireless access point and authentication data for the first wireless access point into a cryptographic function, wherein the list of BSSIDs comprises the first BSSID and the second BSSID.

20. The non-transitory machine readable medium of claim 18, wherein the first BSSID and the second BSSID are pseudo-randomly generated using a cryptographic function.

* * * * *